US009396202B1

(12) United States Patent
Drobychev et al.

(10) Patent No.: US 9,396,202 B1
(45) Date of Patent: Jul. 19, 2016

(54) WEAKLY SYNCHRONIZED GARBAGE COLLECTION AND COMPACTION FOR AGGREGATED, REPLICATED OBJECT STORES

(71) Applicant: Google Inc., Mountain View, CA (US)

(72) Inventors: Alexandre Drobychev, San Mateo, CA (US); Alexander Kesselman, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 143 days.

(21) Appl. No.: 14/142,662

(22) Filed: Dec. 27, 2013

(51) Int. Cl.
*G06F 17/30* (2006.01)

(52) U.S. Cl.
CPC ................................ *G06F 17/30153* (2013.01)

(58) Field of Classification Search
USPC ......... 707/609, 610, 634, 747, 624, 737, 646, 707/638, 813, 713, 692; 717/136
See application file for complete search history.

(56) References Cited

U.S. PATENT DOCUMENTS

| 7,085,789 | B1 * | 8/2006 | Tarditi ................ G06F 12/0253 |
| 7,574,699 | B1 * | 8/2009 | Simmons .............. G06F 8/4434 717/136 |
| 7,778,972 | B1 | 8/2010 | Cormie et al. |
| 7,856,437 | B2 | 12/2010 | Kirshenbaum |
| 8,010,514 | B2 | 8/2011 | Zhang et al. |
| 8,301,671 | B1 * | 10/2012 | Greenwood ......... G06F 11/2094 707/813 |
| 8,341,118 | B2 | 12/2012 | Drobychev et al. |
| 8,346,820 | B2 | 1/2013 | Kesselman et al. |
| 8,463,787 | B2 | 6/2013 | Kirshenbaum |
| 8,504,571 | B2 | 8/2013 | Howe et al. |
| 8,775,485 | B1 * | 7/2014 | Cavage ............. G06F 17/30312 707/713 |
| 2006/0004868 | A1 | 1/2006 | Claudatos et al. |
| 2007/0143564 | A1 | 6/2007 | Uppala |
| 2010/0274762 | A1 | 10/2010 | Murphy et al. |
| 2010/0306171 | A1 * | 12/2010 | Antos ................. G06F 11/1448 707/638 |
| 2010/0325476 | A1 | 12/2010 | Zhang et al. |
| 2011/0035376 | A1 | 2/2011 | Kirshenbaum |
| 2011/0196831 | A1 | 8/2011 | Zunger et al. |
| 2011/0196833 | A1 | 8/2011 | Drobychev et al. |
| 2011/0196900 | A1 | 8/2011 | Drobychev et al. |
| 2012/0158672 | A1 * | 6/2012 | Oltean .............. G06F 17/30091 707/692 |

(Continued)

OTHER PUBLICATIONS

Nath, Evaluating the Usefulness of Content Addressable Storage for High-Performance Data Intensive Applications, 2008, 10 pgs.
Chun, Efficient Replica Maintenance for Distributed Storage Systems, USENIX Association, NSDI '06: 3rd Symposium on Networked Systems Design & Implementation, 2006, 14 pgs.

(Continued)

*Primary Examiner* — Mariela Reyes
*Assistant Examiner* — Thong Vu
(74) *Attorney, Agent, or Firm* — Morgan, Lewis & Bockius LLP

(57) ABSTRACT

Managing consistency of object replicas is performed at a first instance of a distributed storage system. The first instance performs garbage collection on a shard that includes a first plurality of object chunks, thereby removing a second plurality of object chunks from the shard. This leaves a third plurality of object chunks in the shard, where the first plurality of object chunks is the union of the second and third pluralities of object chunks. The first instance sends a first list of identifiers to a second instance of the distributed storage system. The second instance has a replica of the shard. The first list of identifiers specifies the object chunks in the third plurality of object chunks. The second instance removes all object chunks from the replica of the shard that are not included in the first list.

20 Claims, 10 Drawing Sheets

(56) References Cited

U.S. PATENT DOCUMENTS

| | | | |
|---|---|---|---|
| 2012/0259863 A1* | 10/2012 | Bodwin | G06F 17/3023 707/747 |
| 2013/0124467 A1* | 5/2013 | Naidu | G06F 17/30575 707/610 |
| 2013/0124523 A1* | 5/2013 | Rogers | G06F 19/32 707/737 |
| 2013/0339297 A1* | 12/2013 | Chen | G06F 17/30581 707/624 |
| 2014/0095437 A1* | 4/2014 | Hwang | G06F 11/1469 707/634 |
| 2014/0201151 A1* | 7/2014 | Kumarasamy | G06F 11/1469 707/646 |
| 2014/0379715 A1* | 12/2014 | Kesselman | G06F 17/30598 707/737 |

OTHER PUBLICATIONS

Zhan, Metadata Management for Distributed Multimedia Storage System, International Symposium on Electronic Commerce and Security, IEEE Computer Society, 2008, 5 pgs.

Corbett, Spanner, ACM Transactions on Computer Systems, vol. 31, No. 3, Sep. 21, 2012, pp. 1-22.

Google Inc., International Search Report and Written Opinion, PCT/US2014/043721, Oct. 14, 2014, 13 pgs.

Taneja Group Technology Analysts, Technology in Brief, The Object Evolution, EMC Object-Based Storage for Active Archiving and Application Development, Nov. 30, 2012, 12 pgs.

Google Inc., International Search Report and Written Opinion, PCT/US2014/072356, Mar. 30, 2015, 10 pgs.

* cited by examiner

WEAKLY SYNCHRONIZED GARBAGE COLLECTION AND COMPACTION FOR AGGREGATED, REPLICATED OBJECT STORES

TECHNICAL FIELD

The disclosed implementations relate generally to grouping related objects together in a distributed storage system and replicating the objects using the groupings, and more specifically to managing consistency of the groupings at multiple locations.

BACKGROUND

Distributed storage systems built from commodity computer systems can deliver high performance, availability, and scalability for new data-intensive applications at a fraction of the cost compared to monolithic disk arrays. Data is replicated across multiple instances of the distributed storage system at different geographical locations, thereby increasing availability and reducing network distance from clients.

Because of the overhead of managing many individual files for small objects, some systems aggregate multiple objects together in an aggregated store. When files are aggregated, however, there is a need for compaction, which has to be performed periodically in order to reclaim space occupied by deleted objects. Compactions are costly because they involve re-writing each of the objects stored in an aggregated store. Due to these costs, compactions are typically performed in the background, preferably at times when the use of resources is low. As a consequence, it is preferable for each storage cluster to perform its own independent scheduling of compaction.

On the other hand, the requirements for high availability and low latency of object access require that aggregated stores be replicated, typically across two or more distinct geographic locations. Different replicas of the same store are normally compacted at different times, and therefore the replicas end up in different states after compaction. This breaks bitwise identicality of replicas, which increases the complexity and cost of cross-replica integrity checks.

Finally, the process of identifying deleted objects (i.e., garbage collection) is challenging. In some implementations, garbage collection joins the list of known live objects with the directories of all data stores in order to find stored objects that are no longer live. This requires opening all of the stores, which is costly. For the majority of the data stores, the storage savings that could be realized by compaction is outweighed by compaction costs. In fact, it is typical for deleted objects to be distributed non-uniformly across the data stores.

SUMMARY

Some implementations split larger objects into chunks, and use chunks as the basic unit of storage rather than entire objects. For example, some implementations set a chunk size of 2 megabytes, 4 megabytes, or 8 megabytes. If an object fits within the chunk size, then an object has a single chunk. But when an object is larger than the chunk size, the object is split into a number of chunks so that each chunk is within the designated chunk size.

Object chunks are stored in an aggregated store, which is sometimes referred to as a "shard," an "aggregated shard," or a "journal." A journal stores chunks from many different objects. In some cases, all of the chunks for a single object are stored together in the same journal, although not necessarily in contiguous storage. In other cases, the chunks for a single object may be distributed across multiple journals, which may be at the same or different storage locations. As used herein, a storage location is sometimes referred to as an "instance" or a "storage cluster." For load balancing, some implementations have multiple journals open for writes simultaneously, and thus distinct chunks for the same object may be stored in different journals. In some implementations, each object has an associated placement policy that provides rules about where the object is stored. In these implementations, there are distinct journals for each placement policy.

Journals are typically limited in size (e.g., 1 gigabyte, 10 gigabytes, 100 gigabytes, or a terabyte) and/or open for new object chunks for a limited amount of time (e.g., 24 hours). Once a journal is closed, the size of the journal is monotonically decreasing as object chunks are deleted over time. When the amount of space occupied by deleted chunks exceeds a threshold percentage of the total size (e.g., 10%), the garbage is collected and the journal compacted, replacing the existing journal with a new smaller journal that contains just the live object chunks. In some implementations, each journal replica is assigned a compaction identifier that uniquely identifies the set of object chunks in the journal replica. Therefore, two distinct journal replicas that have the same compaction identifier should have identical content. This makes it easy to perform a bitwise comparison of journal replicas using checksums that are provided by the underlying storage system.

Disclosed implementations provide a novel cost-efficient execution scheme of garbage collection and compaction for aggregated, replicated object stores (e.g., files that are comprised of several stored object chunks and are replicated across geographically remote locations). The scheme maintains bitwise identicality of store replicas most of the time and therefore enables simple integrity checks.

In some implementations: (1) metadata is stored for each object, which identifies where (e.g., in which journal) each object chunk is stored; (2) metadata is stored for each journal, which contains, for every replica of the journal, information about the locations of the replica, the number of object chunks in the replica, and the combined size of object chunks stored in that replica (because of latency and independent compaction of distinct journal replicas, the number of chunks and combined size of the chunks are not necessarily the same for two replicas of the same journal); (3) there is a copy of all object and journal metadata in every region (e.g., each group of clusters with good network connectivity); and (4) journals are formed by aggregating chunks from newly uploaded objects, and the journals are sealed when they reach a certain size or age (object chunks are never added to sealed journals). Some implementations satisfy two or three of the conditions (1)-(4).

Because of storage and compaction costs, a compaction operation is worthwhile only if a sufficient amount of storage space is freed by the operation. In some implementations, the threshold is 10%. That is, a compaction operation is performed only when at least 10% of the storage space in a journal will be freed. In some implementations, the threshold is a configurable parameter. As a practical matter, compaction is applied only to sealed journals.

In some implementations, a unique ID is assigned to each replica of each journal in such a way that two replicas with the same ID should be bitwise identical. When a new replica is created by copying an existing replica, the new replica inherits its ID from the existing one. If two replicas have the same ID, their equality can be tested simply by comparing the checksum of the replica files. Implementations maintain a state where the majority of replicas of the same journal have the same ID. In this way, the journals are easily compared while keeping the cost of compaction under control.

The periodic garbage collection (sometimes referred to as "GC") process runs in each region and joins the object metadata with the journal metadata (e.g., using map-reduce technology) in order to determine the list of live chunks for each journal. Then the combined size of the live chunks for that journal is compared to the combined size of live chunks as specified in the journal metadata. The comparison is performed for each replica of the journal located in that region. When the garbage collection process identifies an instance where compaction of a journal replica would meet the threshold requirement, a compaction process at that instance is initiated. During the compaction, no other instance can start a compaction for the same journal.

In the following illustration, garbage collection is run regionally, but this is not required. Some implementations run the garbage collection process at each instance, some implementations run garbage collection globally, and other implementations run garbage collection at various grouping levels, which may vary depending on dynamic conditions, such as current connectivity or loads.

Consider a distributed storage system with four instances (or "clusters"), with two of the instances in the EU region (instances EU1 and EU2), and two of the instances in the US region (instances US1 and US2). Suppose that a journal S has three replicas:

S_EU1, with 250 MB in all object chunks, and compaction identifier ID1

S_EU2, with 260 MB in all object chunks, and compaction identifier ID2

S_US1, with 250 MB in all object chunks, and compaction identifier ID1

Suppose garbage collection in the EU finds that there are 230 MB worth of live object chunks in journal S. Using a 10% compaction threshold requirement, a compaction of S_EU2 is profitable (30 MB=11.5%), whereas compaction of S_EU1 is not profitable (only 20 MB=8%).

Also, suppose garbage collection in the US region finds only 220 MB of live object chunks in journal S. In this example, the object metadata in the US is not totally in sync with the object metadata in the EU, and the US region "knows" about more deletions. Therefore, compaction of the journal replica S_US1 is profitable (30/250=12%).

Once one regional garbage collection process finds a compactable replica, it sends a command to the journal manager running at the location of the replica to schedule a compaction. The command includes the list of live object chunks. A "pending GC" mark is added to the journal metadata, which prevents garbage collection activity on that journal at any other instance. In the current example, if the garbage collection processes for the EU and US run about the same time, whichever one detects a compactable replica first will issue the compaction command, which prevents compaction from proceeding in the other region.

A journal manager runs in every cluster and maintains a list of compaction requests. The list is sorted by profitability (e.g., storage savings minus the cost of compaction), which is the order in which the journal manager schedules the compactions. Once a compaction is complete, the compacted replica gets a new, unique ID based on the remaining live chunks, and the "pending GC" mark is deleted.

In the present example, if the compactable journal replica S_US1 is discovered first, the garbage collector send the compaction request to the journal manager at US1. This puts any potential compaction of the journal replica S_EU2 on hold.

When compaction of the journal replica S_US1 is complete, the journal metadata for journal S will be:

S_EU1, with 250 MB in all object chunks, and compaction identifier ID1

S_EU2, with 260 MB in all object chunks, and compaction identifier ID2

S_US1, with 220 MB in all object chunks, and compaction identifier ID3

In addition to ordinary compaction operations, implementations support a second type of compaction called "synchronization compaction." A synchronization compaction is scheduled whenever there are two replicas of the same journal that differ in size by more than a threshold percent. In some implementations, this threshold is the same as the threshold used for ordinary compactions (e.g., 10%), but this threshold can be set to a different value or controlled by a distinct configurable parameter. In this case, some implementations compact the larger replica so that it will be bitwise identical to the smaller one.

A synchronization compaction takes priority over ordinary compaction (i.e., the ones initiated directly from a garbage collection process). This is because it is better to forego some storage savings when it is possible to keep replicas bitwise identical. Of course, when the space savings of an ordinary compaction are sufficiently large, it may justify yet another ordinary compaction after the synchronization compaction.

Synchronization compaction is performed by sending a request to the journal manager at the location of the smaller replica, directing the journal manager to deliver the list of live object chunks stored in that smaller replica to the instance where the larger replica is stored. At the larger replica, the object chunks not present in that list are removed by compaction. Typically all object chunks present in the smaller replica are also present in the larger one. Therefore, after compaction of the larger replica will be identical to the smaller replica. Because the unique compaction ID's are based on the lists of stored chunks, the newly compacted replica is assigned the same ID as the other (originally smaller) replica.

In the rare case where there is an object chunk in the smaller replica that is not present in the larger replica, the compaction still succeeds, but the newly compacted replica will be assigned a new, unique ID. Note that synchronization compactions do not break the requirement that "all replicas contain all live object chunks at all times." A journal replica may contain an object chunk that is no longer live, but compaction (rather an ordinary compaction or a synchronization compaction) never removes any live chunks.

In the current example, after compacting the journal S_US1, synchronization compaction is profitable for both S_EU1 and S_EU2 because in each case the recovered space exceeds 10% of each replica. In both bases the journal replica S_US1 is the "smaller" replica, and S_EU1 and S_EU2 are the larger replicas. When the synchronization compactions are complete, the journal metadata for journal S will be:

S_EU1, with 220 MB in all object chunks, and compaction identifier ID3

S_EU2, with 220 MB in all object chunks, and compaction identifier ID3

S_US1, with 220 MB in all object chunks, and compaction identifier ID3

Note that these synchronization compactions will be selected even if garbage collection in the EU determines a smaller combined size of live object chunk in S (e.g. 210 MB). On the other hand, if that combined size turns out to be more than 10% below 220 MB (that is, less than 198 MB), then a normal garbage collection compaction will be scheduled for EU replicas instead of the synchronization compaction (and would probably be followed by a synchronization compaction for S_US1).

According to some implementations, a method for managing consistency of object replicas in a distributed storage system is performed at a first instance of the distributed storage system. The first instance has one or more servers, each having one or more processors and memory. The memory stores a plurality of objects and also stores one or more programs for execution by the one or more processors. The first instance performs garbage collection on a first shard that includes a first plurality of object chunks, thereby removing a second plurality of object chunks from the shard. This leaves a third plurality of object chunks in the shard. The first plurality of object chunks is the union of the second and third pluralities of object chunks (and the second and third pluralities of object chunks are disjoint). The first instance sends a first list of identifiers to a second instance of the distributed storage system, where the second instance has a replica of the first shard. The first list of identifiers specifies the object chunks in the third plurality of object chunks. The second instance has one or more servers, and each server has one or more processors and memory. The memory stores one or more programs for execution by the one or more processors. The second instance removes all object chunks from the replica of the first shard that are not included in the first list.

According to some implementations, after removing the second plurality of object chunks from the shard, the first instance assigns a compaction identifier to the first shard based on the first list of identifiers. In addition, after removing all object chunks from the replica of the first shard that are not included in the first list, the second instance assigns a replica compaction identifier to the replica of the first shard based on a second list of identifiers of object chunks in the replica of the first shard after removal of object chunks not included in the first list. When the first list is the same as the second list, the compaction identifier and the replica compaction identifier are the same. In some implementations, the compaction identifier and the replica compaction identifier are computed as a function of the ordered lists of chunk identifiers corresponding to the shard and replica shard.

According to some implementations, when the compaction identifier of the first shard matches the replica compaction identifier of the replica of the first shard, a bitwise comparison of data in the first shard with data in the replica of the first shard is performed. In some implementations, this uses checksums provided by the storage system. When the bitwise comparison shows that the shard and the replica shard are identical, consistency has been verified. In some implementations, such a consistency check is performed prior to deleting a copy of a shard (if they are the same, it is okay to delete either one), or prior to replicating a copy to another instance. When the bitwise comparison shows that the replica of the first shard is not identical to the first shard, another process is run to identify one or more object chunks within the first shard that are not identical to corresponding object chunks in the replica of the first shard, and remedial action is taken.

BRIEF DESCRIPTION OF THE DRAWINGS

Like reference numerals refer to corresponding parts throughout the drawings.

DESCRIPTION OF IMPLEMENTATIONS

Before discussing techniques for managing the placement of objects in a distributed storage system, it is instructive to present an exemplary system in which these techniques may be used.

Distributed Storage System Overview

Figure 1:
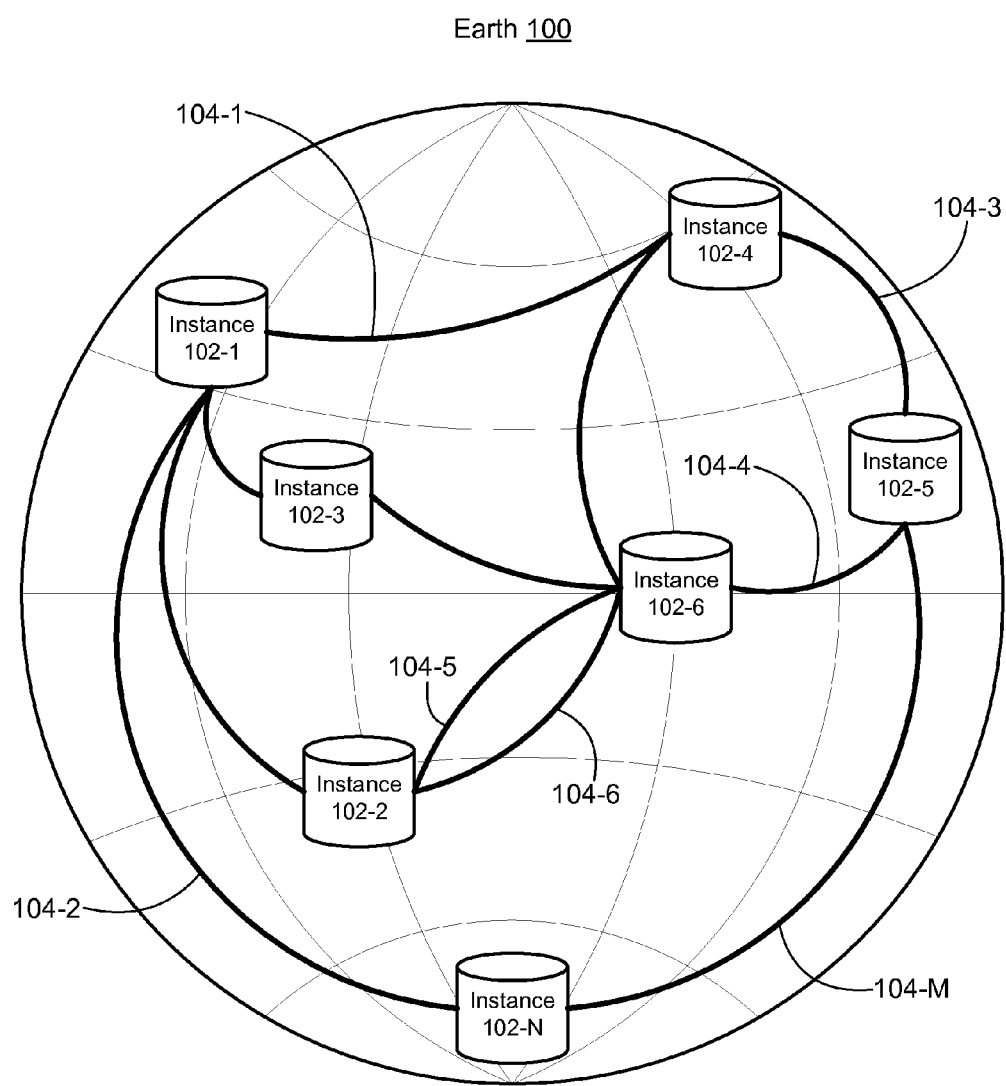
FIG. 1 is a conceptual illustration of a distributed storage system, according to some implementations.

As illustrated in FIG. 1, the disclosed implementations describe a distributed storage system. There are multiple instances 102-1, 102-2, . . . 102-N at various locations on the Earth 100, connected by network communication links 104-1, 104-2, . . . 104-M. Note that an "instance" is also referred to as a "storage location" in this specification. Also note that one or more instances (storage locations) may be located at a particular physical location (e.g., a building, a set of buildings within a predetermined distance of each other, etc.). In some implementations, an instance (such as instance 102-1) corresponds to a data center. In some implementations, multiple instances are physically located at the same data center. A single implementation may have both individual instances at distinct geographic locations as well as one or more clusters of instances, where each cluster includes a plurality of instances, and the instances within each cluster are at a single geographic location.

Figure 4:
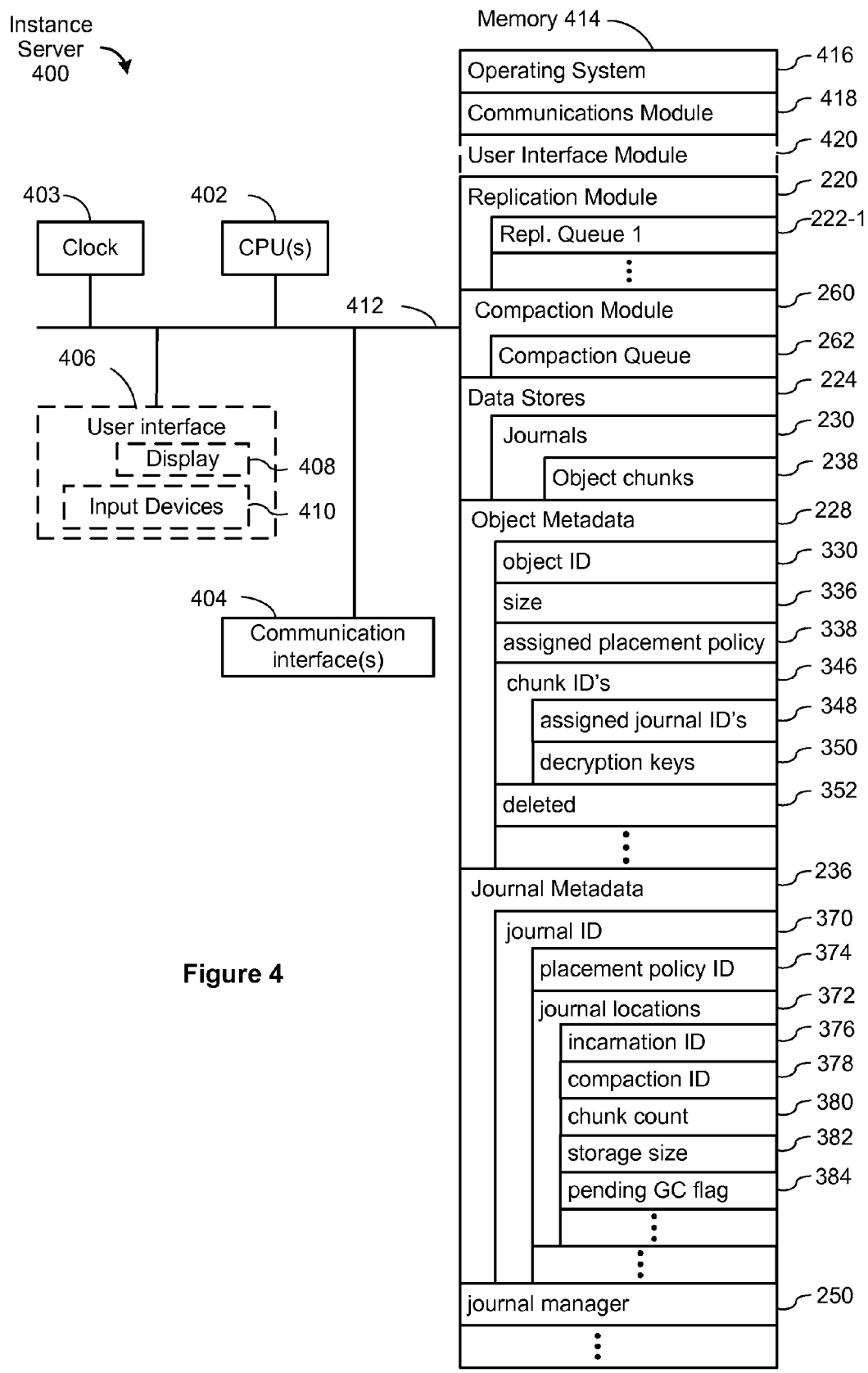
FIG. 4 is a block diagram of an instance server, according to some implementations.

Although the conceptual diagram of FIG. 1 illustrates a particular number of network communication links 104-1, etc., typical implementations may have more or fewer network communication links. In some implementations, there are two or more network communication links between the same pair of instances. For example, the network communication links 104-5 and 104-6 provide network connectivity between instance 102-2 and instance 102-6. In some implementations, the network communication links include fiber optic cable. In some implementations, some of the network communication links use wireless technology, such as microwaves. In some implementations, each network communication link has a specified bandwidth and/or a specified cost for the use of that bandwidth. In some implementations, statistics are maintained about the transfer of data across one or more of the network communication links, including throughput rate, times of availability, reliability of the links, etc. Each instance typically has data stores and associated databases, and utilizes a farm of server computers ("instance servers" as illustrated in FIG. 4) to perform all of the tasks. In some implementations, one or more instances of the distribute storage system has limited functionality. For example, the limited functionality may include acting as a repeater for data transmissions between other instances. Note that limited functionality instances may or may not include any of the data stores.

Figure 2:
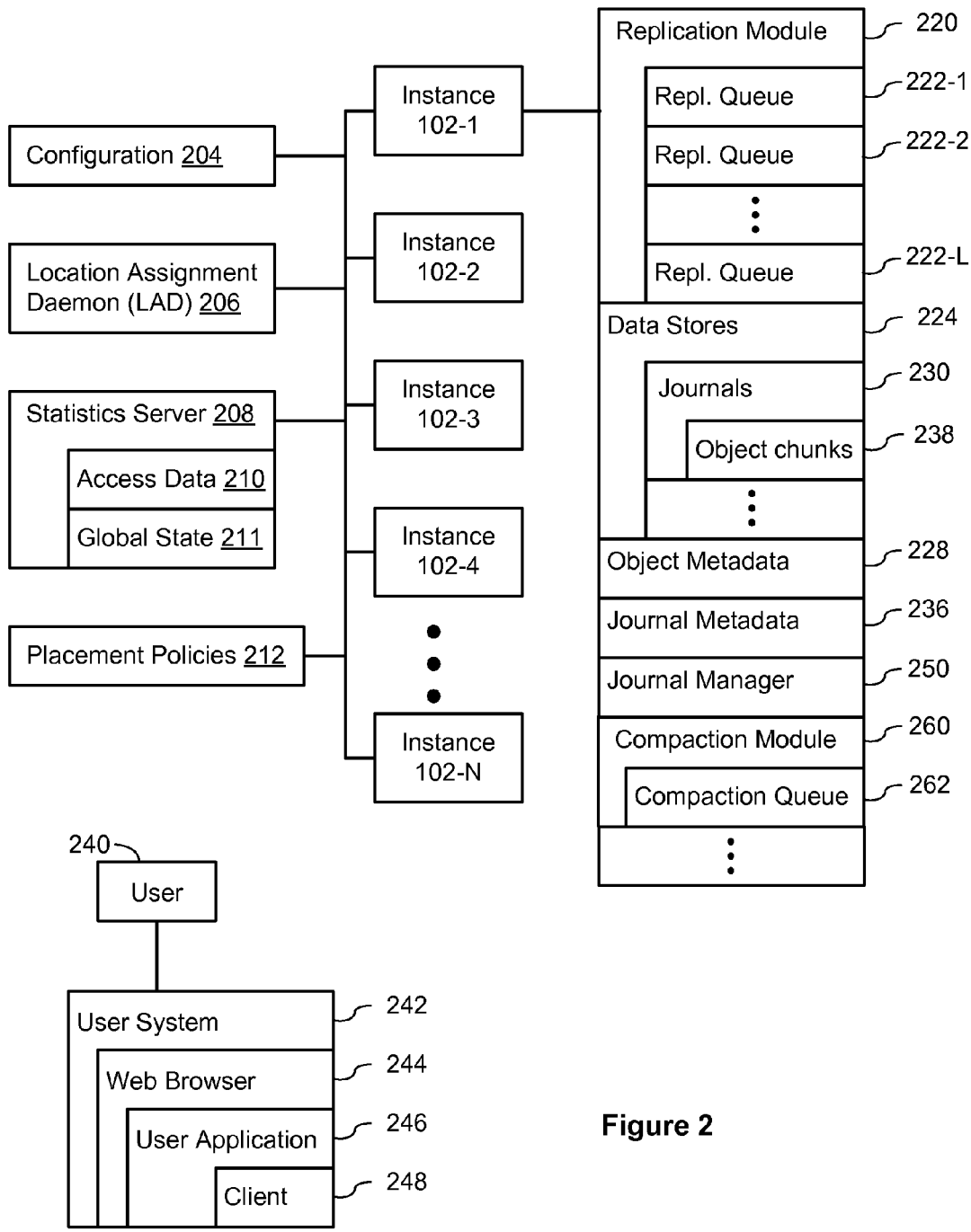
FIG. 2 is a block diagram illustrating the elements of a distributed storage system, according to some implementations.

FIG. 2 is a block diagram illustrating the elements of a distributed storage system 200, according to some implementations. The distributed storage system 200 includes instances 102-1, 102-2, 102-3, 102-4, ... 102-N. A respective instance 102-1 includes a replication module 220 that replicates object chunks 238 between instances. In some implementations, the object chunks 238 are stored in data stores 224 of the respective instance 102-1. Each object chunk 238 comprises an object 226 or a portion of an object 226. The data stores 224 may include distributed databases, file systems, tape backups, and any other type of storage system or device capable of storing objects. In some implementations, the replication module 220 uses one or more replication queues 222-1, 222-2, ..., 222-L to replicate objects 226 or journals 230. Replication requests for objects or journals to be replicated are placed in a replication queue 222, and the objects or journals are replicated when resources (e.g., bandwidth) are available. In some implementations, replication requests in a replication queue 222 have assigned priorities, and the highest priority replication requests are replicated as bandwidth becomes available.

In some implementations, a background replication process creates and deletes copies of objects or journals based on placement policies 212 and access data 210 and/or a global state 211 provided by a statistics server 208. The placement policies 212 specify how many copies of an object are desired, where the copies should reside, and in what types of data stores the data should be saved. Using placement policies 212, together with the access data 210 (e.g., data regarding storage locations at which replicas of objects were accessed, times at which replicas of objects were accessed at storage locations, frequency of the accesses of objects at the storage locations, etc.) and/or the global state 211 provided by the statistics server 208, a location assignment daemon (LAD) 206 determines where to create new copies of an object or journal and what copies may be deleted. When new copies are to be created, replication requests are inserted into a replication queue 222. In some implementations, the LAD 206 manages replicas of objects or journals globally for the distributed storage system 200. In other words, there is only one LAD 206 in the distributed storage system 200. The use of the placement policies 212 and the operation of a LAD 206 are described in more detail below.

Note that in general, a respective placement policy 212 may specify the number of replicas of an object to save, in what types of data stores the replicas should be saved, storage locations where the copies should be saved, etc. In some implementations, a respective placement policy 212 for an object includes criteria selected from the group consisting of a minimum number of replicas of the object that must be present in the distributed storage system, a maximum number of the replicas of the object that are allowed to be present in the distributed storage system, storage device types on which the replicas of the object are to be stored, locations at which the replicas of the object may be stored, locations at which the replicas of the object may not be stored, and a range of ages for the object during which the placement policy for the object applies. For example, a first placement policy may specify that each object in a webmail application must have a minimum of 2 replicas and a maximum of 5 replicas, wherein the replicas of the objects can be stored in data centers outside of China, and wherein at least 1 replica of each object must be stored on tape. A second placement policy for the webmail application may also specify that for objects older than 30 days, a minimum of 1 replica and a maximum of 3 replicas are stored in the distributed storage system 200, wherein the replicas of the objects can be stored in data centers outside of China, and wherein at least 1 replica of each object must be stored on tape.

In some implementations, a user 240 interacts with a user system 242, which may be a computer system or other device that can run a web browser 244. A user application 246 runs in the web browser, and uses functionality provided by database client 248 to access data stored in the distributed storage system 200 using a network. The network may be the Internet, a local area network (LAN), a wide area network (WAN), a wireless network (WiFi), a local intranet, or any combination of these. In some implementations, the database client 248 uses information in a global configuration store 204 to identify an appropriate instance to respond to the request. In some implementations, user application 246 runs on the user system 242 without a web browser 244. Exemplary user applications include an email application and an online video application.

In some implementations, each instance stores object metadata 228 for each of the objects stored in the distributed storage system. Some instances store object metadata 228 only for the objects that have replicas stored at the instance (referred to as a "local instances"). Some instances store object metadata 228 for all objects stored anywhere in the distributed storage system (referred to as "global instances"). The object metadata 228 is described in more detail with respect to FIGS. 3 and 4.

In some implementations, each instance stores journal metadata 236 for each of the journals stored in the distributed storage system 200. Some instances store journal metadata 236 only for the journals that have replicas stored at the instance. Some instances store journal metadata for all journals stored anywhere in the distributed storage system. The journal metadata is described in more detail below with respect to FIGS. 3 and 4.

Stored in the data stores 224 are multiple types of journals. The majority of the journals are closed journals 230. Closed journals 230 do not store any additional object chunks, but can have content deleted and compacted. In some implementations, two or more small closed journals 230 for the same placement policy 212 can be stitched together to form a single replacement closed journal 230. Because data within a closed journal 230 can be deleted and compacted, closed journals 230 can get smaller over time, and thus become candidates for stitching. A journal is typically open for new object chunks for a limited period of time or until it reaches a certain size. Once a journal is closed, it is not re-opened.

In some implementations, each instance 102 includes a compaction module 260 that is invoked to reclaim storage occupied by deleted object chunks. The compaction process is illustrated in more detail below with respect to FIGS. 6 and 7. The compaction module takes an existing journal, writes out the live chunks in the journal to a new journal, designates the new journal as the storage journal for the chunks it contains, then deletes the old journal replica. The new journal replica does not have the garbage of the old journal replica, and thus frees storage space that was previously wasted.

In some implementations, the compaction module 260 uses one or more compaction queues 262, which are lists of compaction requests. In some implementations, the compaction queue 262 is a priority queue. In some implementations, the priorities are based on various factors, including: the amount of space expected to be freed, the percentage of space to be freed within a journal, access statistics 210 (current and/or historical), and whether the compaction request is a regular request from the garbage collection module 322 or a synchronization compaction request (which is illustrated in greater detail below with respect to FIG. 7).

Some implementations include a journal manager 250, which may send or receive compaction requests, provide local journal information (e.g. store metadata 504) to a garbage collection module 322, determine when to stitch together small journals, handle deletions, and handle read and write requests for the journals. Some implementations split the work of the journal manager into multiple modules, either to have different tasks handled by different program modules and/or for load balancing.

Figure 3:
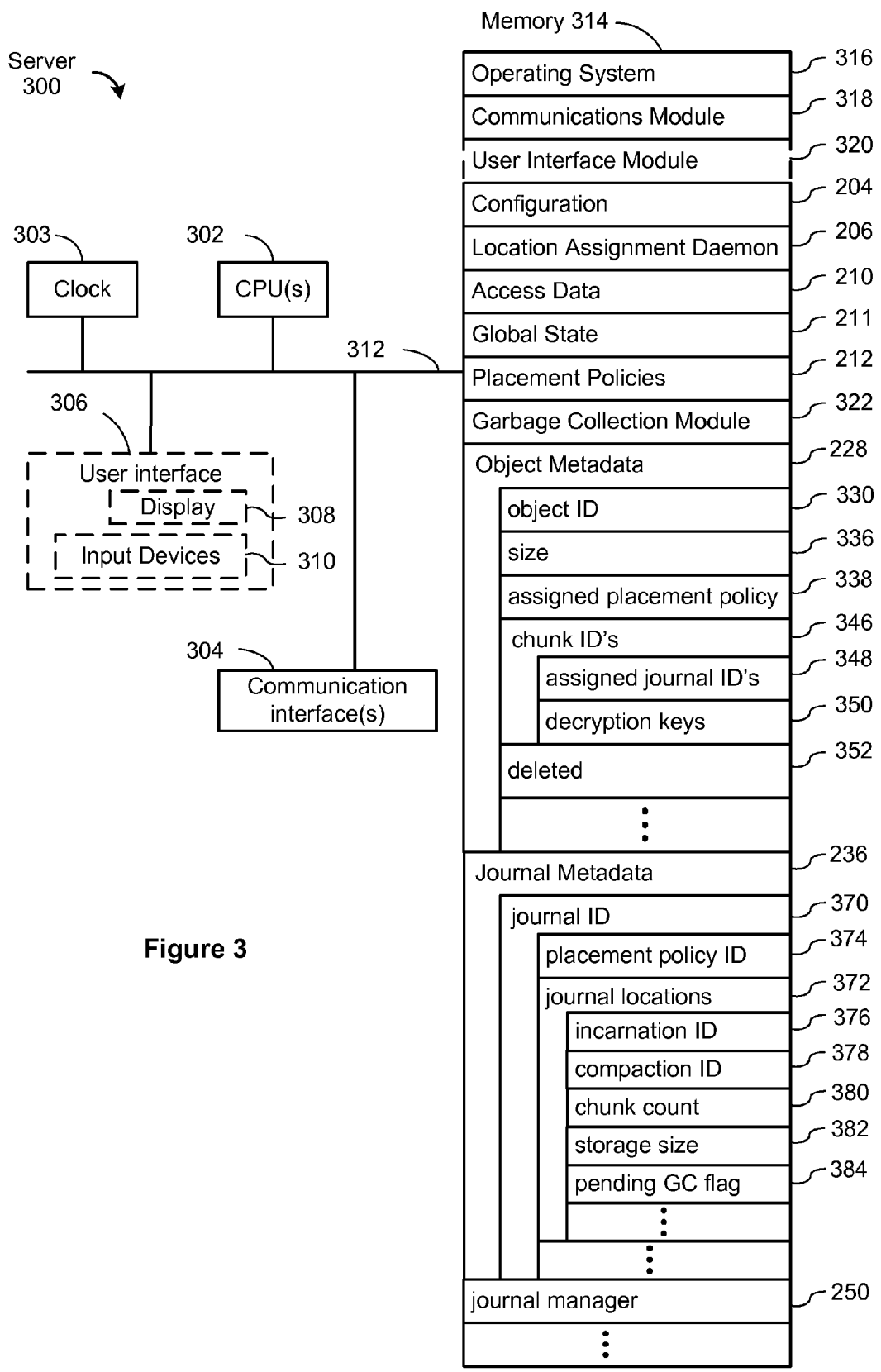
FIG. 3 is a block diagram of a server, according to some implementations.

FIG. 3 is a block diagram of a server 300, according to some implementations. The server 300 typically includes one or more processing units (CPU's) 302, a clock 303 that reports the current date and/or time, one or more network or other communications interfaces 304, memory 314, and one or more communication buses 312 for interconnecting these components. The communication buses 312 may include circuitry (sometimes called a chipset) that interconnects and controls communications between system components. In some implementations, the clock 303 is a local clock that is periodically synchronized with a clock server (e.g., a quorum clock server or any other clock server on a network, etc.). The server 300 optionally may include a user interface 306 comprising a display device 308 and input devices 310 (e.g., keyboard, mouse, touch screen, keypads, etc.). Memory 314 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 314 may optionally include one or more storage devices remotely located from the CPU(s) 302. Memory 314, or alternately the non-volatile memory device(s) within memory 314, comprises a computer readable storage medium. In some implementations, memory 314 stores the following programs, modules and data structures, or a subset thereof:

- an operating system 316 that includes procedures for handling various basic system services and for performing hardware dependent tasks;
- a communication module 318 that is used for connecting the server 300 to other computers via the one or more communication interfaces 304 (wired or wireless) and one or more communication networks, such as the Internet, other wide area networks, local area networks, metropolitan area networks, and so on;
- an optional user interface module 320 that receives commands from the user via the input devices 310 and generates user interface objects in the display device 308;
- the configuration 204, as described herein;
- the LAD 206, as described herein;
- access data 210, as described herein;
- the global state 211, as described herein;
- placement policies 212, as described herein;
- a Garbage Collection Module 322, which identifies storage space occupied by object chunks that have been deleted (i.e., "garbage" 516) and determines when there is sufficient garbage within a journal that it would be cost effective to compact the journal. The operation of the garbage collection module is described in more detail below with respect to FIGS. 5-7;
- object metadata 228 for the objects stored in the distributed storage system. The object metadata 228 for each object may include an object ID 330, which uniquely identifies the object within the distributed storage system. The metadata 228 may include the author of the object, which may be a name and/or identifier of a person or entity (e.g., email address). In some implementations, the identifier is unique. The metadata may include a datestamp or timestamp that indicates when the object was created (e.g., uploaded to the distributed storage system). The metadata 228 may include the size 336 of the object, which is typically measured in bytes or allocation blocks. The metadata 228 for each object includes an assigned placement policy 338, which may be assigned individually or based on other criteria (e.g., all videos uploaded from the United States may have the same assigned placement policy 338). Placement policies provide rules or constraints where object replicas are stored, how many replicas there are, and/or the type of storage used (e.g., on disk versus tape backup). The metadata 228 includes a set of chunk ID's 346 that identify the content chunks for each object. In some implementations, a chunk ID is specified as an offset within an object. For example, the first chunk has an offset of 0. In some implementations, the offsets are specified in megabytes. In some implementations, the chunk ID's are unique identifiers (such as a GUID). In some implementations, each chunk ID is formed by concatenating the object ID with the offset of the chunk. In some implementations, the chunk ID if formed using a content hash or content digest. Corresponding to each chunk ID is an assigned journal ID 348, which indicates in which journal the corresponding chunk is stored. In some implementations, there is a decryption key 350 corresponding to each chunk ID. In these implementations, the actual chunk content is encrypted using an encryption key, and the corresponding decryption key 350 is used to retrieve the content. In some implementations, there is a distinct decryption key for each chunk as illustrated in FIG. 3, but in other implementations, there is a single decryption key for an entire object. In some implementations, when an object chunk is "deleted," the decryption key 350 is erased, making the corresponding content inaccessible. Actual removal of the stored (encrypted) content can occur later as part of a garbage collection operation. Some implementations include a "deleted" flag 352, which is set when the object is deleted.
- journal metadata 236 for each journal 230 stored in the distributed storage system 200. The journal metadata 236 includes a journal ID 370 for each journal. Each journal has a unique placement policy ID 374, when enables replication or deletion of a journal as a whole because all object chunks stored in the journal have the same assigned placement policy 338. Corresponding to each journal ID 370 is a set of journal locations 372 that specify where the journal is stored. In some implementations, the journal locations are instances (e.g., instance identifiers). In some implementations, a journal location 372 also specifies the type of data store 224 at each instance 102 that stores the journal. For each journal location, the journal metadata 236 stores additional information. In some implementations, there is a unique incarnation ID 376, which uniquely identifies the journal replica and location. In this case, two replicas of the same journal at different locations would have different incarnation IDs 376. In some implementations, each location of a journal has a unique compaction ID, which identifies the set of chunks stored in the journal replica at that location. In some implementations, the compaction ID is computed as a hash of the concatenation of the chunk ID's 346 corresponding to the journal. Note that the compaction ID 378 is just based on the set of stored chunks; when two replicas at different location have exactly the same set of chunks, their compaction ID's 378 are the same. Some implementations include for each journal location 372 a chunk count 380, which indicates the number of chunks stored in the journal. In some implementations, the chunk count 380 is only updated when a journal is initially closed and when a journal is compacted. In these implementations, some of the "chunks" included in the chunk count 380 may be deleted. In other implementations, the chunk count 380 is updated dynamically as chunks are deleted, even if the space occupied a deleted chunk remains as "garbage" up until the next garbage collection. Similar to the chunk count data 380, some implementations store the storage size 382 of the chunks in the journal. In some implementations, the storage size represents the total size of the chunks when the journal is originally closed or after a compaction. In other implementations, the storage size 382 is updated dynamically as chunks are deleted. In some implementations, there is a pending GC flag 384, which is associated with a specific journal and location. When this flag is set, a garbage collection process has started or is about to start, and thus prevents garbage collection from running for the same journal at other instances. In the illustrated implementation, the pending GC flag 384 is stored for each journal/location individually, but some implementations include a pending GC flag at a coarser level (e.g., for an entire instance, for all journals at an instance with a specific placement policy, for all journals stored on a certain data store type at an instance, etc.); and a journal manager 250, as described above in FIG. 2.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 314 may store a subset of the modules and data structures identified above. Furthermore, memory 314 may store additional modules and data structures not described above.

Although FIG. 3 shows a "server," FIG. 3 is intended more as functional description of the various features that may be present in a set of servers 300 than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers and how features are allocated among them will vary from one implementation to another, and may depend in part on the amount of data traffic that the system must handle during peak usage periods as well as during average usage periods. In some implementations, a subset of the LAD 206, the access data 210, the global state 211, and the placement policies 212 are located on separate servers. For example, the LAD 206 may be located at a server (or set of servers), the access data 210 and the global state 211 may be located and maintained by a statistics server 208 (or a set of statistics servers 208), and the placement policies 212 may be located on another server (or a set of other servers).

FIG. 4 is a block diagram of an instance server 400 for an instance 102, according to some implementations. In some implementations, an instance server 400 is a specific case of a server 300, and thus the description above with respect to FIG. 3 applies to FIG. 4 as well. An instance server 400 typically includes one or more processing units (CPU's) 402 for executing modules, a clock 403 that reports the current date and/or time, programs and/or instructions stored in memory 414 and thereby performing processing operations, one or more network or other communications interfaces 404, memory 414, and one or more communication buses 412 for interconnecting these components. In some implementations, the clock 403 is a local clock that is periodically synchronized with a clock server (e.g., a quorum clock server or any other clock server on a network, etc.). In some implementations, the instance server 400 includes a user interface 406 comprising a display device 408 and one or more input devices 410. In some implementations, memory 414 includes high-speed random access memory, such as DRAM, SRAM, DDR RAM or other random access solid state memory devices. In some implementations, memory 414 includes non-volatile memory, such as one or more magnetic disk storage devices, optical disk storage devices, flash memory devices, or other non-volatile solid state storage devices. In some implementations, memory 414 includes one or more storage devices remotely located from the CPU(s) 402. Memory 414, or alternately the non-volatile memory device(s) within memory 414, comprises a computer readable storage medium. In some implementations, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting the instance server 400 to other instance servers or computers via the one or more communication network interfaces 404 (wired or wireless) and one or more communication networks, such as the Internet, other wide area networks, local area networks, metropolitan area networks, and so on;
- an optional user interface module 420 that receives commands from the user via the input devices 410 and generates user interface objects in the display device 408;
- a replication module 220 and replication queues 222, as described herein;
- a compaction module 260, which is invoked to reclaim storage occupied by deleted object chunks. The compaction process is illustrated in more detail below with respect to FIGS. 6 and 7. The compaction module takes an existing journal, writes out the live chunks in the journal to a new journal, designates the new journal as the storage journal for the chunks it contains, then deletes the old journal replica. The new journal replica does not have the garbage of the old journal replica, and thus frees storage space that was previously wasted. In some implementations, the compaction module 260 uses one or more compaction queues 262, which are lists of compaction requests. In some implementations, the compaction queue 262 is a priority queue. In some implementations, the priorities are based on various factors, including: the amount of space expected to be freed, the percentage of space to be freed within a journal, access statistics 210 (current and/or historical), and whether the compaction request is a regular request from the garbage collection module 322 or a synchronization compaction request (which is illustrated in greater detail below with respect to FIG. 7);

data stores 224 (e.g., distributed databases, file systems, tape stores, Big Tables, etc.), which store the object chunks 238 in journals 230 as described herein;

object metadata 228 and corresponding metadata elements 330, 336, 338, 346, 348, 350, and 352 as described in FIG. 3 with respect to server 300;

journal metadata 236 and corresponding journal metadata elements 370-384 as described in FIG. 3 with respect to server 300; and journal manager 250, as described above in FIG. 2.

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 414 may store a subset of the modules and data structures identified above. Furthermore, memory 414 may store additional modules and data structures not described above.

Although FIG. 4 shows an "instance server," FIG. 4 is intended more as functional description of the various features that may be present in a set of instance servers 400 than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers and how features are allocated among them will vary from one implementation to another, and may depend in part on the amount of data traffic that the server must handle during peak usage periods as well as during average usage periods. For example, at a single instance 102 there may be a hundred instance servers 400 or thousands of instance servers 400.

In some implementations, to provide faster responses to clients and to provide fault tolerance, each program or process that runs at an instance is distributed among multiple computers. The number of instance servers 400 assigned to each of the programs or processes can vary, and depends on the workload.

Figure 5:
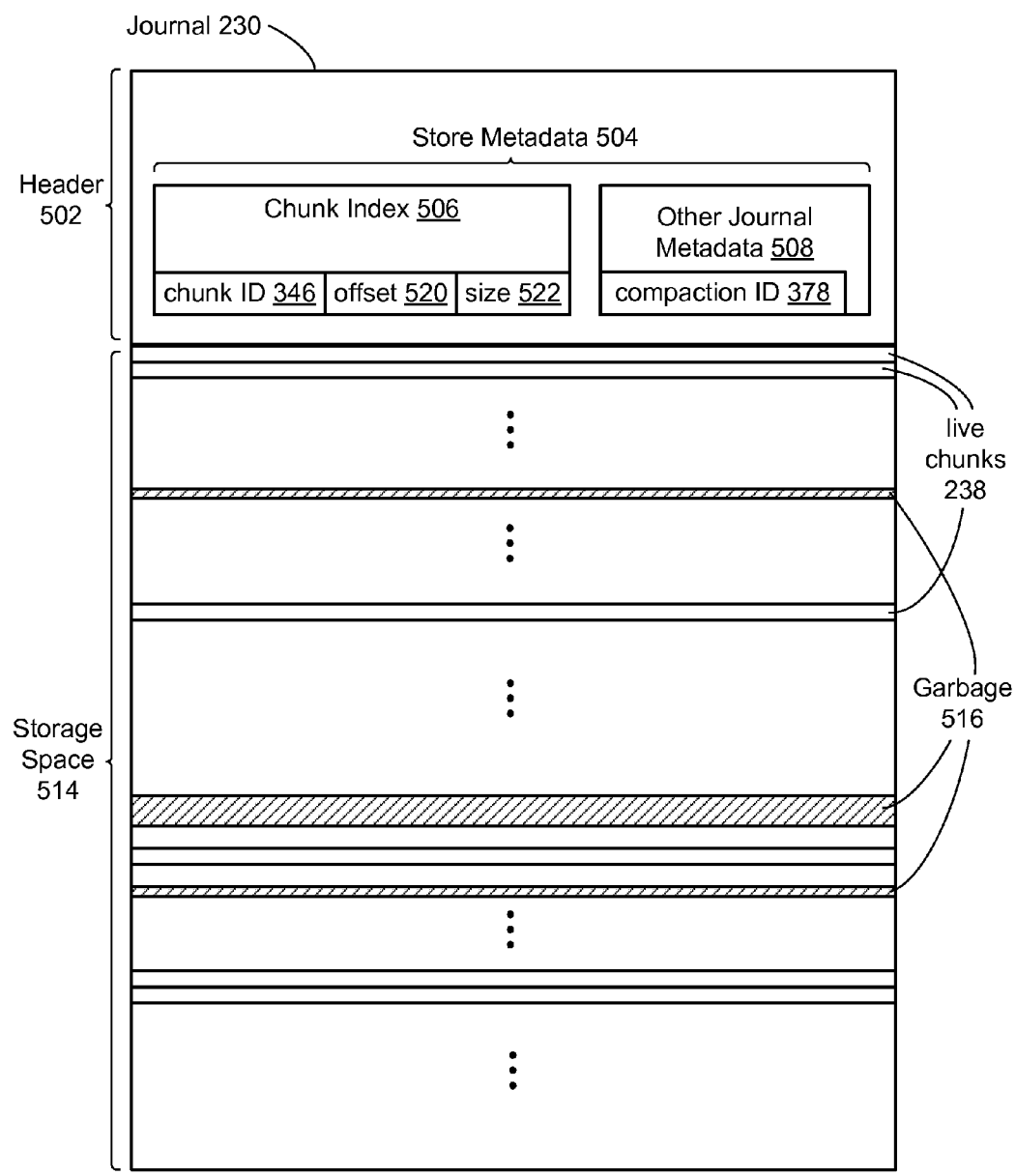
FIG. 5 illustrates a journal for storage of object chunks in accordance with some implementations.

FIG. 5 illustrates a journal 230 for storage of multiple object chunks 238 in accordance with some implementations. The illustrated journal 230 includes a header portion 502, and storage space 514 where the actual chunk content is stored. In other implementations, the header 502 and storage space 514 are stored as separate files. The header 502 includes store metadata 504, which is metadata for the journal itself. Included in the store metadata is a chunk index 506, which specifies how each chunk is stored. In some implementations, the chunk index 504 is sorted by chunk ID 346, and for each chunk ID 346 there is the corresponding offset 520 and size 522. The offset 520 is typically the offset from the beginning of the storage space 514. For example, the very first chunk stored in the storage space 514 has an offset of 0. The size 522 specifies the size of the chunk, which is typically specified in bytes. In addition to the chunk index, some implementations store additional journal metadata 508. In some implementations, the additional journal metadata 378 includes the compaction ID 378, which is a unique identifier for the list of chunks as of the last compaction operation (the initial "compaction ID" is saved when a journal is closed, which does not follow a compaction operation). The compaction ID 378 uniquely identifies the ordered set of chunks within the journal, so the storage space 514 for two journals with the same compaction ID 378 should be bitwise identical.

As illustrated in FIG. 5, the storage space 514 includes both live chunks 238 as well as garbage 516. When an object is deleted, the storage space for the object's chunks is not immediately reclaimed because the overhead would greatly exceed to value for reclaiming space from a single object (with the possible exception of very large objects). Therefore, as objects are deleted, corresponding object chunks 238 become garbage 516. The amount of garbage 516 increases over time until the Garbage Collection Module 322 runs and determines that there is sufficient recoverable space so that it is worth the overhead of a compaction. In some implementations, the threshold is 10%, so when the garbage 516 represents 10% or more of the total storage space 514, a compaction is requested.

Figure 6:
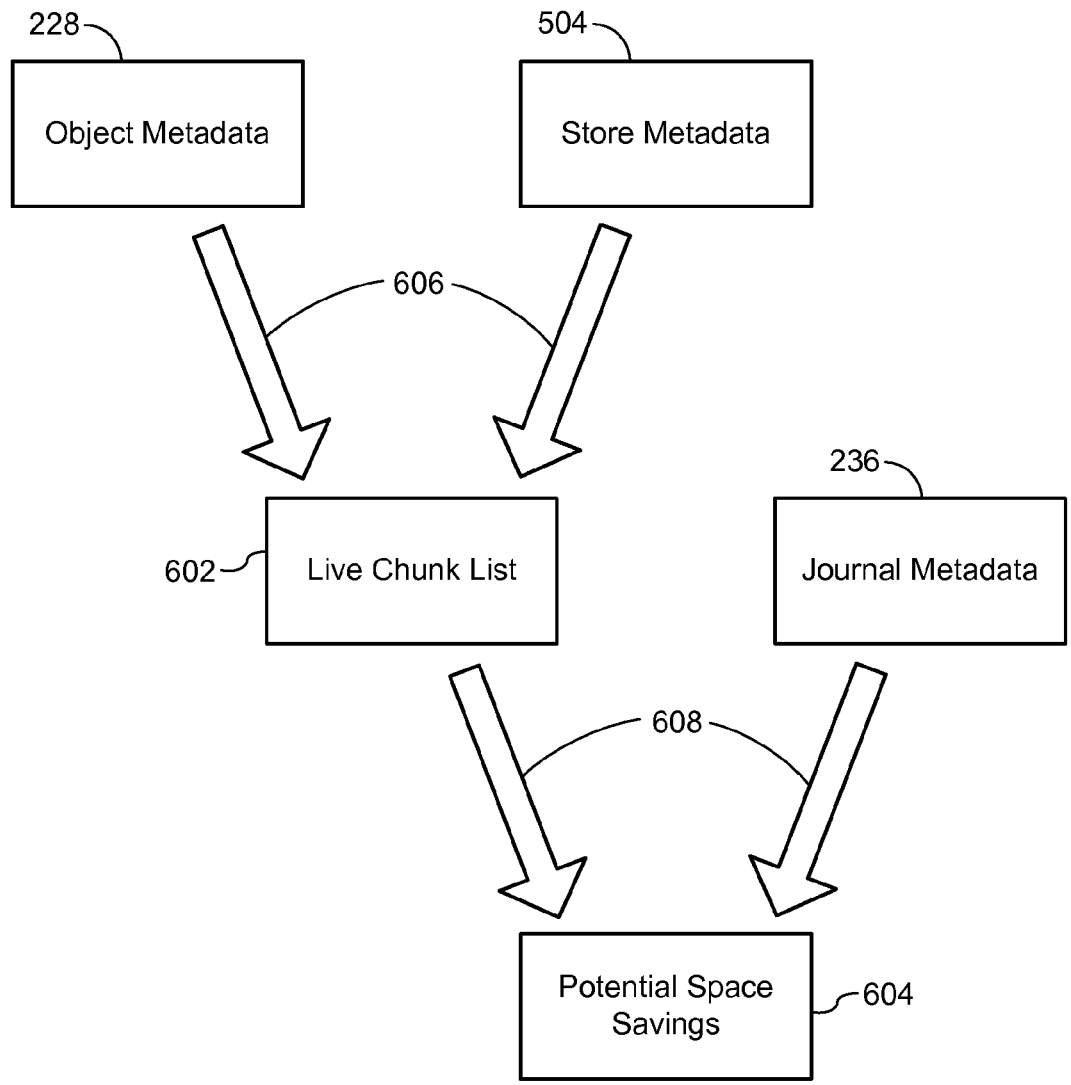
FIG. 6 is a conceptual diagram of a garbage collection process in accordance with some implementations.

FIG. 6 illustrates schematically a garbage collection process performed by a Garbage Collection Module 322. The Garbage Collection Module 322 may run for a single journal 230, all journals in a single instance, all journals stored at one or more instances with a designated region (e.g., the United States), all journals stored on a specific data storage medium at one instance, or other designated set of journals/locations. In some implementations, the scope of garbage collection is determined dynamically based on available resources, journal metadata, or other criteria. In some implementations, optimal groupings for garbage collection are determined empirically over time as various groupings are tested. For simplicity, the remainder of the discussion with respect to FIG. 6 is based on evaluating a single journal 230 at a single instance 102. Some implementations use set a pending GC flag 384 to indicate that garbage collection is processing or about to process for a journal. The flag 384 is reset to a default state when the garbage collection process is complete.

In some implementations, the Garbage Collection Module 322 collects store metadata 504 for the object chunks in the selected journal 230. In particular, the information in the chunk index 506 specifies the list of chunk ID's 346 stored in the journal. In some implementations, the chunk index is not updated as individual chunks are deleted, so there are chunk ID's 346 in the index 506 that do not correspond to live objects. The data in the chunk index for a "dead" chunk still points to a location in the storage space 514, but now that space is considered garbage 516. In some implementations, as individual chunks are deleted, the corresponding chunk ID 346 is removed from the chunk index 506, making the corresponding storage locations inaccessible.

The Garbage Collection Module 322 also collects object metadata 228 corresponding to the identified journal 230 (e.g., chunk ID's 346 whose assigned journal ID's 348 match the journal ID 370 of the selected journal 230). In some implementations, the object metadata 228 is not deleted for objects that are deleted. Instead, some implementations use a "deleted" flag 352 to identify an object that has been deleted. In some implementations, when an object chunk is "deleted," the corresponding decryption key 350 is deleted, making the "deleted" chunk inaccessible. The physical storage still exists, but the chunk is effectively deleted. Using either a deleted flag 352, or information about which decryption keys have been deleted designates the storage associated with those chunk ID's 346 as non-live.

The Garbage Collection Module 322 compares (606) the collected object metadata 228 to the collected store metadata 504 to identify the live chunk list 602 for the journal replica.

Using the list of live chunks, the Garbage Collection Module 322 can determine the combined size of the live chunks in the journal 230 at the designated instance. This is compared (608) to journal metadata 236, including the storage size 382, to determine potential space savings 604. Some implementations specify a threshold percent of storage savings to trigger a compaction operation, such as 8%, 10%, or 12%. When the threshold is reached, a command is sent to the compaction module 260 at the corresponding instance to perform the compaction operation. Some implementations use one or more compaction queues 262 for the compaction requests. In some implementations, the compaction queue 262 is a FIFO queue. In other implementations, the compaction queue 262 is a priority queue, where the priority is determined based on one or more factors. The factors may include the percent space savings (e.g., a journal with greater space savings would be compacted before a journal with less space savings), the absolute space savings (e.g., a journal with move savings is compacted before a journal with smaller savings, regardless of the relative percentages), the type of request (e.g., a synchronization compaction has priority over an ordinary compaction), the historical utilization of the journals (e.g., a journal with higher historical utilization may be compacted first), current utilization of the journals (e.g., a journal that is currently being heavily used may go later in the schedule), or availability of network or data center resources.

In some implementations, the garbage collection module runs at a server 300 that is not an instance server 400. This is the underlying model in the description above. However, some implementations run garbage collection at each instance where a journal is stored. In these implementations, the store metadata 504 need not be transmitted across a network link to another server. In some implementations, the Garbage Collection Module 322 runs at a server 300 that is collocated at an instance 102 where the journal 230 is stored.

As FIG. 6 illustrates, a garbage collection operation does not always result in a compaction operation. Garbage collection runs to determine whether it would be cost effective to run compaction.

The present disclosure is not limited to the specific garbage collection illustrated in FIG. 6. One of skill in the art recognizes alternative processes may be used to identify the set of live chunks 602 for a journal, including storing additional data fields in the object metadata 228, the journal metadata 236, and/or the store metadata 504.

Figure 7:
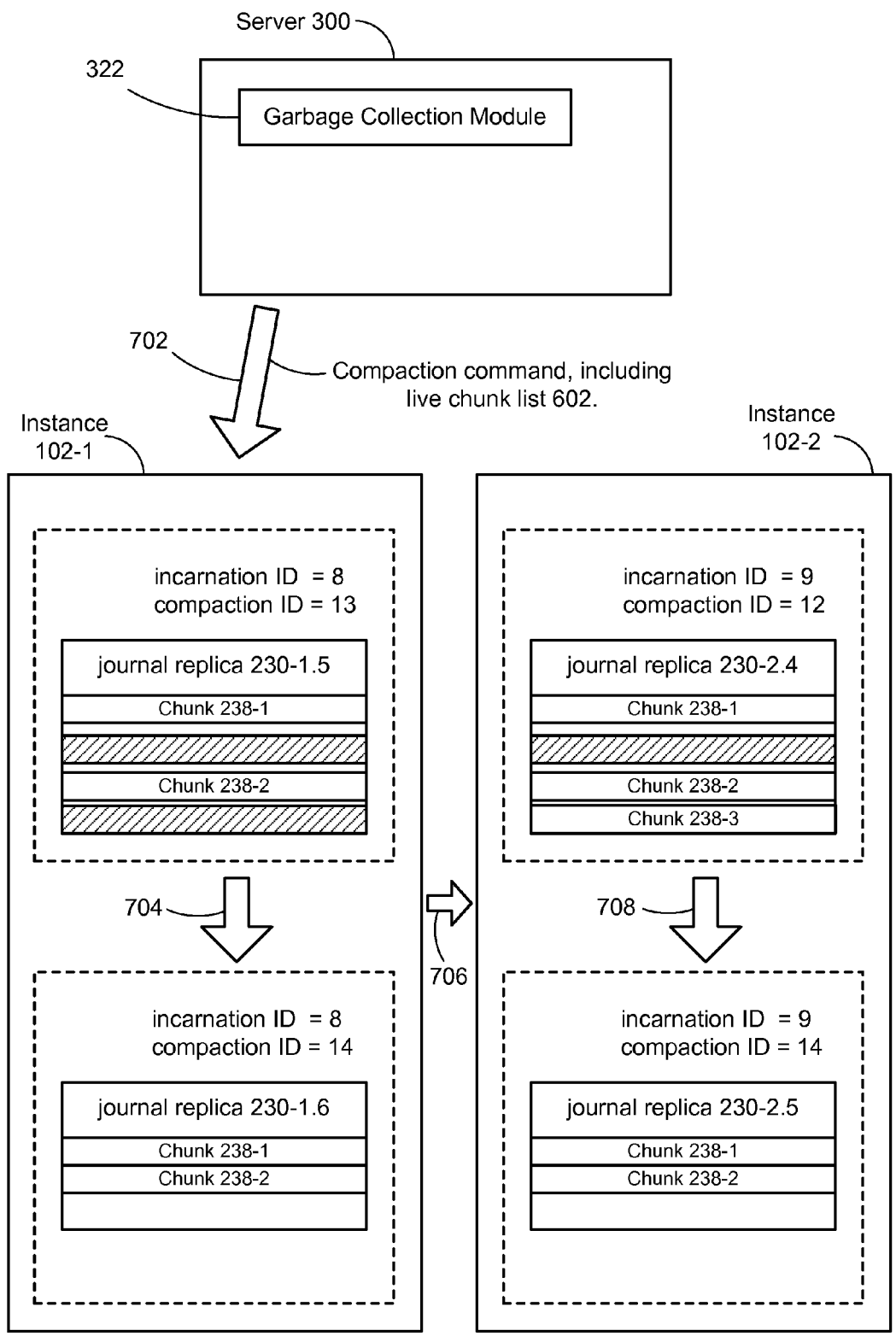
FIG. 7 is a schematic diagram showing both ordinary compaction and synchronization compaction in accordance with some implementations.

FIG. 7 illustrates a compaction process performed by a compaction module 260. Initially, the Garbage Collection Module 322 at a server 300 determines that it is profitable to run compaction on a specific journal 230. The Garbage Collection Module 322 sends (702) a compaction command to an instance 102-1. The command includes the live chunk list 602.

At the instance 102-1, the journal replica 230-1.5 is in an initial state. This replica at this location (instance 102-1) has incarnation ID 8. In addition, based on the chunks presently in the replica, the replica has compaction ID 13. Note that the journal replica includes both live chunks 238-1 and 238-2, as well as regions of garbage. The compaction process 704 constructs a new replica of the journal by copying only the live chunks from the original replica 230-1.5. In some implementations, the order of the chunks in the original replica 230-1.5 is retained as the new replica 130-1.6 is being written. In some implementations, the order of the chunks in the new replica 230-1.6 is based on the chunk ID's 238 of the retained live chunks. The new replica 230-1.6 includes only the live chunks, and has a distinct journal ID. Once the new replica 230-1.6 is complete, corresponding object metadata 228 (e.g., assigned journal ID's 348) are updated to point to the new journal. Subsequently the original journal replica 230-1.5 is removed, making all of the space formerly occupied by the journal free. During compaction, a new compaction ID 378 is assigned to the new journal replica 230-1.6 based on the set of chunks stored in the replica. In FIG. 7, the original replica had compaction ID 13, whereas the new replica has compaction ID 14. Of course the incarnation ID (which is 8), does not change as a result of the compaction because the incarnation ID is based on just the journal and the location. The compaction process also updates the chunk index 506 so that the index includes only the chunks that are retained.

The process just described on the left hand side of FIG. 7 represents an ordinary compaction triggered in response to a command from the garbage collection module 322. Disclosed implementations have a second type of compaction called "synchronization compaction" represented by the right hand side of FIG. 7. In some implementations, a synchronization compaction is triggered whenever there is an compaction. In other implementations, a synchronization compaction is triggered under the same or similar conditions as an ordinary compaction. Specifically, because the live chunk list 602 from the ordinary compaction is already known, the same list 602 can be compared to other replicas of the same journal. When the space savings for another replica exceeds a threshold percent (or threshold amount), synchronization compaction is triggered. In some implementations, the synchronization compaction command 706 is sent by the journal manager 250 at the first instance 102-1 to the second instance, and placed in a compaction queue 262 at the second instance. In the illustrated example, prior to the compaction at instance 102-1, the replica 230-1.5 had compaction ID 13, which is different from the compaction ID 12 of the replica 230-2.4 at the second instance 102-2. In particular, not that the replica 230-2.4 includes a chunk 238-3 that was not present in the original replica 230-1.5 at the first instance 102-1. Of course, at the second instance 102-2, the journal replica 230-2.4 has an incarnation ID 9 that is different from the incarnation ID 8 of the replica at the first instance 102-1.

In general, the synchronization compaction takes priority over ordinary compaction, so the compaction process 708 may start right away. The internal process of synchronization compaction is only slightly different. In ordinary compaction 704, every chunk in the live chunk list 602 is written to the new replica 230-1.6, and there are no other "live" chunks. Garbage collection already determined the set of live chunks 602. However, in synchronization compaction, the provided list 602 may not exactly match the set of known live chunks. In some instances, the second replica 102-2 may have one or more additional chunks (such as chunk 238-3) that it believes are live that are in fact known to the first instance 102-1 as being dead. These additional "zombie" chunks are removed as part of synchronization compaction. In some instances, the second instance has more up to date information about one or more chunks. That is, one or more "chunks" in the live chunk list 602 is already known to the second instance as being dead. In this case, the "zombie" chunks from the live chunk list are not kept by the compaction at the second instance 102-2. That is, once a chunk is designated as dead, it is dead, and it is just a matter of time before all instance know about it. This second scenario is not illustrated in FIG. 7.

As illustrated in FIG. 7, at the second instance 102-2, the chunk 238-3 is removed because it is not in the live chunk list 602, and only the live chunks from the list 602 are retained. The synchronization compaction 708 does not change the incarnation ID (=9), but the new replica 230-2.5 is assigned a new compaction ID based on the list of live chunks saved in the journal replica. Here, the set of chunks is the same as the set of chunks in the replica 230-1.6 at the first instance 102-1, so the journal replica 230-2.5 at the second instance 102-2 is assigned the same compaction ID 14.

Because the journal replica 230-1.6 has the same compaction ID as the journal replica 230-2.5, the two replica should be bitwise identical. Because they are supposed to be identical, it is simple to compare the two journal replicas using checksums. In a distributed storage system it is important to be able to perform quick integrity checks in order to guarantee the accuracy of the data. Periodic integrity checks are performed, and integrity checks are also performed before certain operations, such as deleting a replica or creating a new replica at another instance.

Figure 8A:
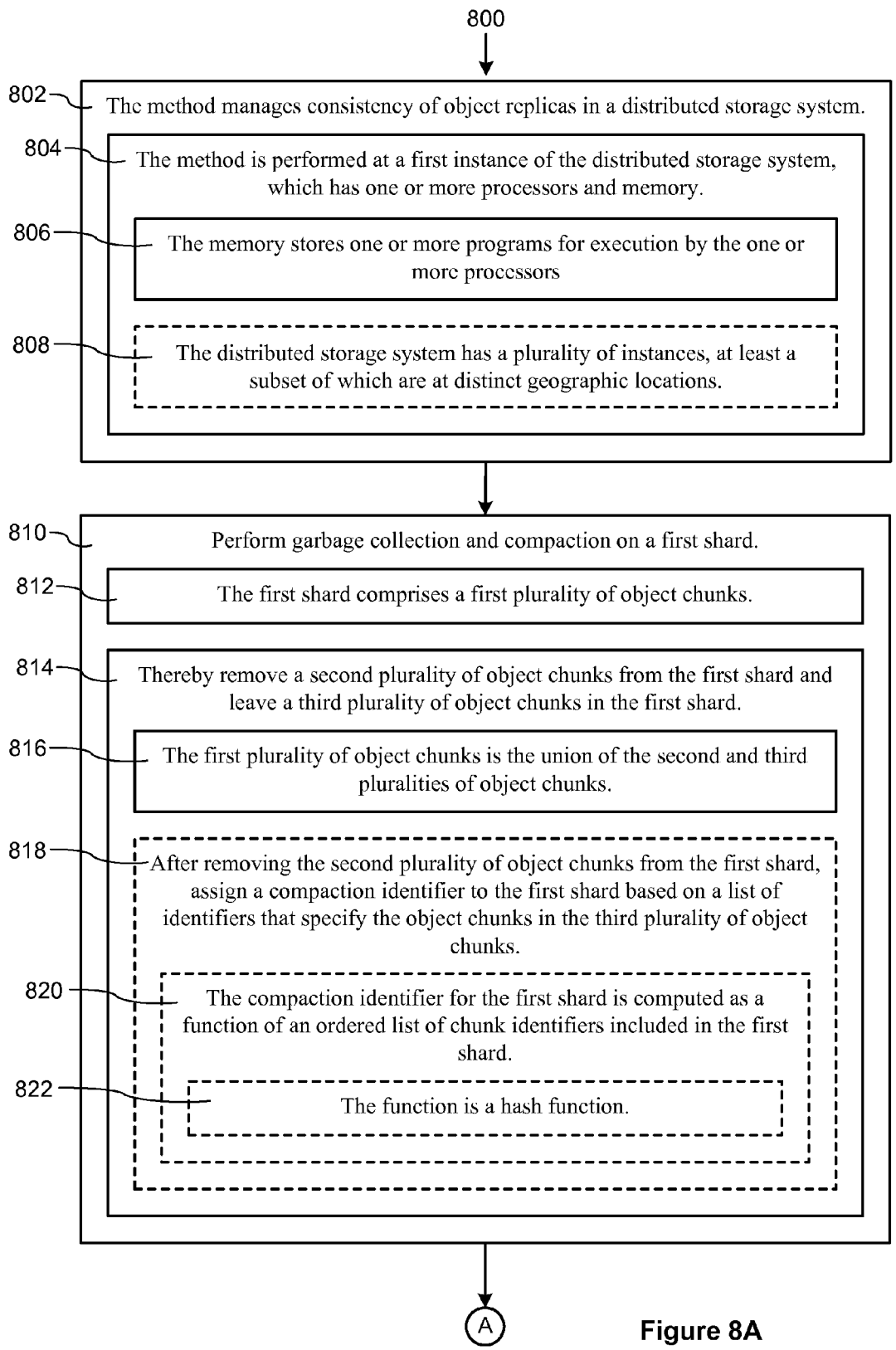
FIGS. 8A-8C illustrate a method of managing consistency of object replicas in a distributed storage system according to some implementations.
Figure 8B:
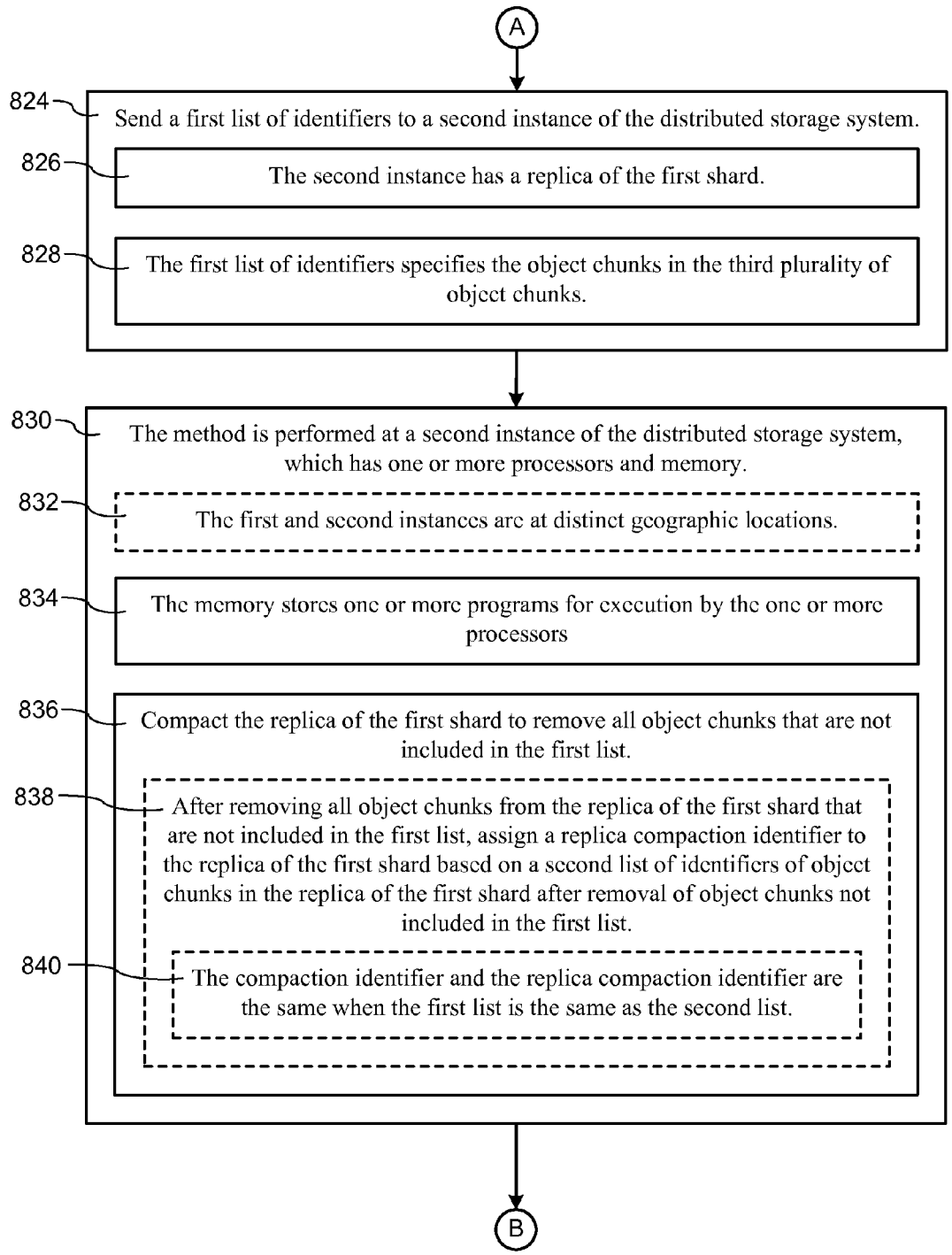
Figure 8C:
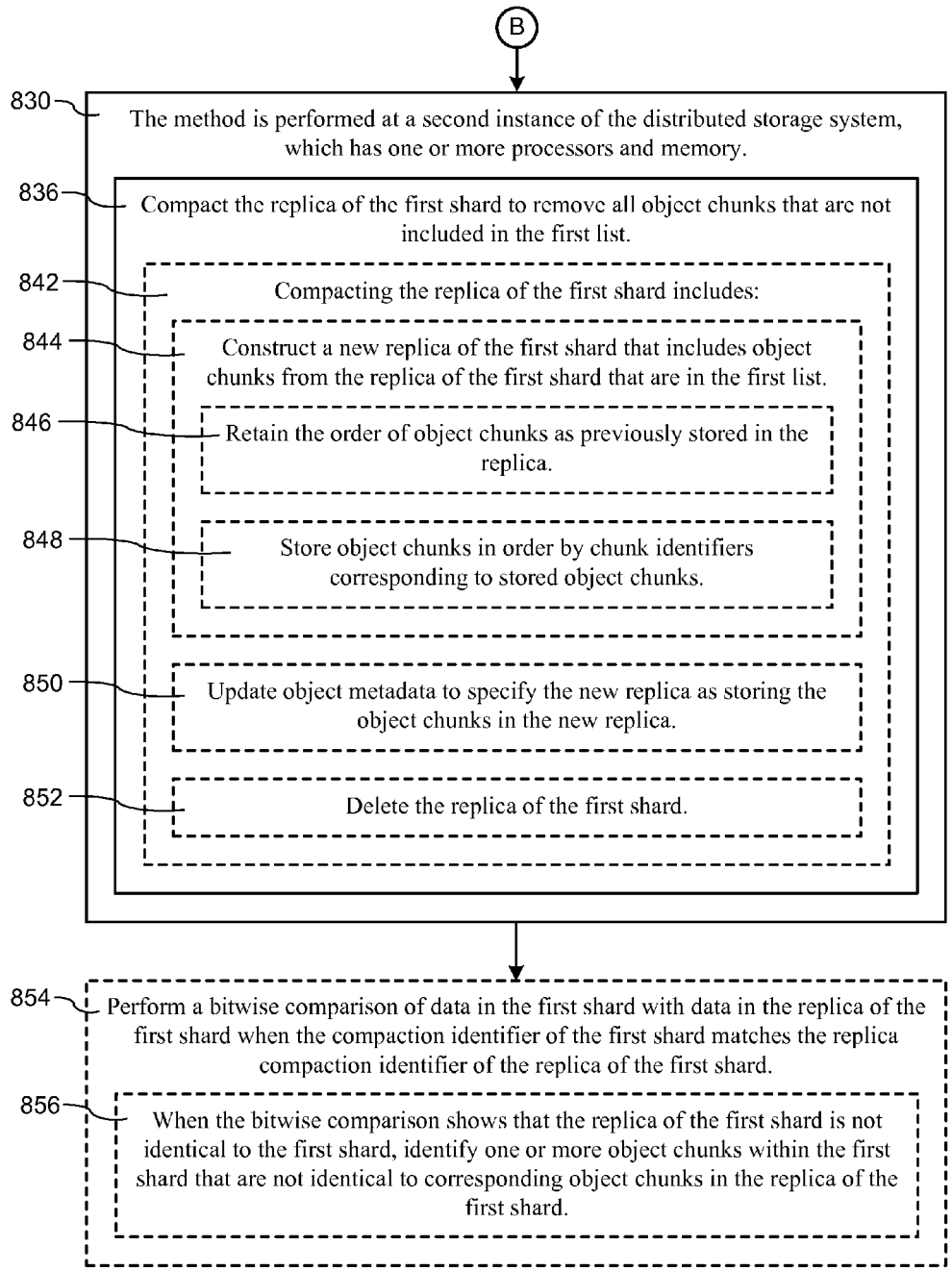

FIGS. 8A-8C illustrate a process 800 for managing (802) consistency of objects in a distributed storage system 200 in accordance with some implementations. The process operates at two or more instances 102 of the distributed storage system, where part of the process is performed (804) at a first instance 102-1. The first instance has one or more servers 400, each having (804) one or more processors and memory. The memory stores (806) one or more programs for execution by the one or more processors. In some implementations, the distributed storage system 200 has (808) a plurality of instances 102, of which at least a subset are (808) at distinct geographic locations.

The process performs (810) garbage collection and compaction on a shard 230-1 at the first instance 102-1. In some implementations, garbage collection is performed at the first instance, but other implementations perform garbage collection at an instance 102 or server 300 separate from the instance where the shard 230-1 is stored. As noted above, a shard is sometimes referred to as a journal. The shard comprises (812) a first plurality of object chunks 238. A shard 230-1 typically stores many object chunks 238 from many different objects. For example, a shard may contain 10,000 object chunks from 7000 distinct objects. Each implementation typically sets an upper limit on chunk size, such as 2 megabytes or 16 megabytes.

As illustrated above in FIGS. 6 and 7, a garbage collection process does not always result in a compaction operation. Each implementation typically establishes a minimum threshold of space savings (e.g., as a percent, such as 10%, or as an absolute amount, such as 50 megabytes).

Compaction removes (814) a second plurality of object chunks 238 from the first shard 230-1 and leaves a third plurality of object chunks in the first shard. The first plurality of object chunks is (816) the union of the second and third pluralities of object chunks. Of course there is no overlap between the second and third pluralities.

In some implementations, after removing the second plurality of object chunks from the first shard 230-1, a compaction identifier 378-1 is assigned (818) to the first shard. The compaction identifier 378-1 is based (818) on a list of identifiers that specify the object chunks in the third plurality of object chunks. In particular, the compaction identifier 378-1 uniquely identifies the third plurality of chunks. In some implementations, the compaction identifier 378-1 is a concatenation of the chunk identifiers 346 corresponding to the chunks in the third plurality (in the order in which they appear in the compacted shard). In some implementations, the compaction identifier 378-1 for the first shard is computed (820) as a function of the ordered list of chunk identifiers 346 included in the first shard 230-1. In some implementations, the function is (822) a hash function. One of ordinary skill in the art recognizes that there are many ways to assign a compaction identifier that uniquely identify the set of chunks in the compacted shard.

The first list of identifiers is sent (824) to a second instance 102-2 of the distributed storage system 200 as illustrated above in FIG. 7. The second instance 102-2 has (826) a replica 230-2 of the first shard. The first list of identifiers specifies (828) the object chunks in the third plurality of object chunks (i.e., the chunks that remain in the compacted first shard 230-1 at the first instance 102-1). In some implementations, the first instance 102-1 sends the first list 602 of identifiers to the second instance in a command to perform synchronization compaction. In other implementations, the first list of identifiers is sent to the second instance by a server 300 or system other than the first instance (e.g., by the server 300 that performed the garbage collection).

A second part of the process 800 is performed (830) at a second instance 102-2 of the distributed storage system. The second instance 102-2 has one or more servers 400, and each of the servers has (830) one or more processors and memory. In some implementations, the first and second instances are (832) at distinct geographic locations. In some implementations, the first and second instances comprise distinct hardware (e.g., distinct sets of servers), but are collocated at the same data center. The memory on each server stores (834) one or more programs for execution by the one or more processors.

The second instance compacts (836) the replica 230-2 of the first shard to remove all object chunks that are not included in the first list. This is described above with respect to FIG. 7. Note that the replica 230-2 of the first shard is not guaranteed to have every chunk 238 in the first list. Due to latency between the first and second instances, an object (and its corresponding chunks) may be deleted at the second instance before deletion at the first instance.

In some implementations, after removing all object chunks 238 from the replica 230-2 of the first shard that are not included in the first list, a replica compaction identifier 378-2 is assigned (838) to the replica of the first shard. The replica compaction identifier 378-2 is assigned (838) based on a second list of identifiers of object chunks in the replica of the first shard after removal of object chunks not included in the first list. The assignment of the replica compaction identifier 378-2 is performed in the same way as the assignment of the compaction identifier 378-1 to the first shard so that the compaction identifier 378-1 and the replica compaction identifier 378-2 are (840) the same when the first list is the same as the second list. This creates an easy and efficient way to perform a consistency check between shards.

In some implementations, compacting the replica 230-2 of the first shard includes (842) constructing (844) a new replica of the first shard that includes object chunks from the replica of the first shard that are in the first list. That is, rather than reorganizing the contents of the original replica, a new replica is created (844) that contains just the live chunks specified in the first list 602. In some implementations, constructing the new replica retains (846) the order of the object chunks 238 as stored in the original replica. In some implementations, the new replica stores (848) the object chunks 238 in order by chunk identifiers 346 corresponding to the stored object chunks 238. Whatever order is applied is used consistently so that compaction at the first instance 102-1 and compaction at the second instance 102-2 result in bitwise identical shards if they contain the same chunks. Compacting also includes (842) updating (850) the object metadata 228 (e.g., assigned journal ID's 348) to specify the new replica as the storage location for the object chunks 238 in the new replica. In other words, the chunk pointers 348 in the object metadata 228 now point to the new replica. Once the new replica is created and the object metadata 228 points to the new replica, the old replica of the first shard is deleted (852).

An objective of the process 800 is to enable simple bitwise comparison of shard replicas. In particular, when the compaction identifier 378-1 of the first shard matches (854) the replica compaction identifier 378-2 of the replica of the first shard, a bitwise comparison is performed. The comparison may be performed by the first instance 102-1, the second instance 102-2, or a server 300 that is not located at either the first or second instance.

In general, the bitwise comparison (e.g., using checksums) reveals that the replicas are identical. However, in some circumstances, replicas that should be identical are not in reality. One of skill in the art recognizes that there are many different types of hardware or software errors that can result in data corruption. In some implementations, when the bitwise comparison shows that the replica 230-2 of the first shard is not identical to the first shard 230-1, the process identifies (856) one or more object chunks 238 within the first shard 230-1 that are not identical to corresponding object chunks in the replica 230-2 of the first shard. In some implementations, when replicas at two instances are not consistent, the two replicas are compared to a third replica 230-3 (e.g., from a tape backup store). In some circumstances, to compare to the third replica, the third replica may be compacted as well (e.g., using the process illustrated in FIG. 7). For example, retrieve a copy from a tape backup store, compact the third replica using the first list 602, then compare the third replica to the corresponding shard at the first instance and the replica at the second instance. In some implementations, when the third replica matches one of the other two, the third replica is used to overwrite the mismatched version. One of skill in the art recognizes that other remedial actions may be performed when the bitwise comparison fails.

Disclosed implementations thus enable very fast consistency checks in most cases, which limit the circumstances where slower consistency tests must be performed.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. For example, some implementations use hierarchical storage in which some or all of the chunks are further split into smaller units of storage, which reduces the amount of object metadata 228. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for managing consistency of object replicas in a distributed storage system, comprising:
at a first instance of the distributed storage system, having one or more processors and memory, wherein the memory stores one or more programs for execution by the one or more processors:
performing garbage collection and compaction on a first shard comprising a first plurality of object chunks, thereby removing a second plurality of object chunks from the first shard and leaving a third plurality of object chunks in the first shard, wherein the first plurality of object chunks is the union of the second and third pluralities of object chunks;
sending a first list of identifiers to a second instance of the distributed storage system, wherein the second instance has a replica of the first shard and wherein the first list of identifiers specifies the object chunks in the third plurality of object chunks; and
at the second instance, having one or more processors and memory, wherein the memory stores one or more programs for execution by the one or more processors:
compacting the replica of the first shard to remove all object chunks that are not included in the first list.

2. The method of claim 1, further comprising:
after removing the second plurality of object chunks from the first shard, assigning a compaction identifier to the first shard based on the first list of identifiers; and
after removing all object chunks from the replica of the first shard that are not included in the first list, assigning a replica compaction identifier to the replica of the first shard based on a second list of identifiers of object chunks in the replica of the first shard after removal of object chunks not included in the first list;
wherein the compaction identifier and the replica compaction identifier are the same when the first list is the same as the second list.

3. The method of claim 2, wherein the compaction identifier for the first shard is computed as a function of an ordered list of chunk identifiers included in the first shard.

4. The method of claim 3, wherein the function is a hash function.

5. The method of claim 2, further comprising:
performing a bitwise comparison of data in the first shard with data in the replica of the first shard when the compaction identifier of the first shard matches the replica compaction identifier of the replica of the first shard; and
when the bitwise comparison shows that the replica of the first shard is not identical to the first shard, identifying one or more object chunks within the first shard that are not identical to corresponding object chunks in the replica of the first shard.

6. The method of claim 1, wherein compacting the replica of the first shard comprises constructing a new replica of the first shard that includes object chunks from the replica of the first shard that are in the first list, updating object metadata to specify the new replica as storing the object chunks in the new replica, and deleting the replica of the first shard.

7. The method of claim 6, wherein constructing the new replica comprises retaining the order of object chunks as previously stored in the replica.

8. The method of claim 6, wherein constructing the new replica comprises storing object chunks in order by chunk identifiers corresponding to stored object chunks.

9. The method of claim 1, wherein the first and second instances are at distinct geographic locations.

10. A computer system for managing consistency of object replicas in a distributed storage system, comprising:
a first instance and a second instance, each having
one or more processors;
memory; and
one or more programs stored in the memory, the one or more programs comprising instructions executable by the one or more processors;
wherein the one or more programs at the first instance include instructions for:
performing garbage collection and compaction on a first shard comprising a first plurality of object chunks, thereby removing a second plurality of object chunks from the first shard and leaving a third plurality of object chunks in the first shard, wherein the first plurality of object chunks is the union of the second and third pluralities of object chunks;

sending a first list of identifiers to a second instance of the distributed storage system, wherein the second instance has a replica of the first shard and wherein the first list of identifiers specifies the object chunks in the third plurality of object chunks; and wherein the one or more programs at the second instance include instructions for:

compacting the replica of the first shard to remove all object chunks that are not included in the first list.

11. The computer system of claim 10, the one or more programs further comprising instructions for:

after removing the second plurality of object chunks from the first shard, assigning a compaction identifier to the first shard based on the first list of identifiers; and after removing all object chunks from the replica of the first shard that are not included in the first list, assigning a replica compaction identifier to the replica of the first shard based on a second list of identifiers of object chunks in the replica of the first shard after removal of object chunks not included in the first list;

wherein the compaction identifier and the replica compaction identifier are the same when the first list is the same as the second list.

12. The computer system of claim 11, wherein the compaction identifier for the first shard is computed as a function of an ordered list of chunk identifiers included in the first shard.

13. The computer system of claim 12, wherein the function is a hash function.

14. The computer system of claim 11, the one or more programs further comprising instructions for:

performing a bitwise comparison of data in the first shard with data in the replica of the first shard when the compaction identifier of the first shard matches the replica compaction identifier of the replica of the first shard; and when the bitwise comparison shows that the replica of the first shard is not identical to the first shard, identifying one or more object chunks within the first shard that are not identical to corresponding object chunks in the replica of the first shard.

15. The computer system of claim 10, wherein the instructions for compacting the replica of the first shard comprise instructions for constructing a new replica of the first shard that includes object chunks from the replica of the first shard that are in the first list, updating object metadata to specify the new replica as storing the object chunks in the new replica, and deleting the replica of the first shard.

16. The computer system of claim 15, wherein the instructions for constructing the new replica comprise instructions for retaining the order of object chunks as previously stored in the first shard.

17. The computer system of claim 15, wherein the instructions for constructing the new replica comprise instructions for storing object chunks in order by chunk identifiers corresponding to stored object chunks.

18. The computer system of claim 10, wherein the first and second instances are at distinct geographic locations.

19. A non-transitory computer readable storage medium storing one or more programs configured for execution by one or more processors of a computer system to manage consistency of object replicas in a distributed storage system having a first instance and a second instance, the one or more programs comprising instructions for:

at the first instance:

performing garbage collection and compaction on a first shard comprising a first plurality of object chunks, thereby removing a second plurality of object chunks from the first shard and leaving a third plurality of object chunks in the first shard, wherein the first plurality of object chunks is the union of the second and third pluralities of object chunks;

sending a first list of identifiers to a second instance of the distributed storage system, wherein the second instance has a replica of the first shard and wherein the first list of identifiers specifies the object chunks in the third plurality of object chunks; and at the second instance:

compacting the replica of the first shard to remove all object chunks that are not included in the first list.

20. The non-transitory computer readable storage medium of claim 19, the one or more programs further comprising instructions for:

after removing the second plurality of object chunks from the first shard, assigning a compaction identifier to the first shard based on the first list of identifiers; and after removing all object chunks from the replica of the first shard that are not included in the first list, assigning a replica compaction identifier to the replica of the first shard based on a second list of identifiers of object chunks in the replica of the first shard after removal of object chunks not included in the first list;

wherein the compaction identifier and the replica compaction identifier are the same when the first list is the same as the second list.

* * * * *